(12) United States Patent
Shao et al.

(10) Patent No.: US 11,988,920 B1
(45) Date of Patent: May 21, 2024

(54) DIRECT-LIT BACKLIGHT MODULE FOR DISPLAY DEVICE AND DISPLAY DEVICE

(71) Applicant: Qisda Corporation, Taoyuan (TW)

(72) Inventors: Chang-Min Shao, Taoyuan (TW); Pin-Feng Yu, Taoyuan (TW); Jyun-Sheng Syu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/378,717

(22) Filed: Oct. 11, 2023

(30) Foreign Application Priority Data

Nov. 2, 2022 (CN) .......................... 202211364014.2

(51) Int. Cl.
*G02F 1/133* (2006.01)
*G02F 1/1335* (2006.01)
*G02F 1/13357* (2006.01)

(52) U.S. Cl.
CPC .. *G02F 1/133611* (2013.01); *G02F 1/133603* (2013.01); *G02F 1/133607* (2021.01)

(58) Field of Classification Search
CPC ......... G02F 1/133603; G02F 1/133607; G02F 1/133611
USPC ...................................................... 362/97.1
See application file for complete search history.

(56) References Cited

U.S. PATENT DOCUMENTS

| | | | |
|---|---|---|---|
| 2012/0200802 A1* | 8/2012 | Large ................... | G02B 6/0046 362/613 |
| 2019/0331965 A1* | 10/2019 | Xiao ................. | G02F 1/133606 |
| 2021/0110764 A1* | 4/2021 | Hughes ............... | H01L 25/0753 |
| 2021/0407438 A1* | 12/2021 | Fattal .................... | G02F 1/1336 |
| 2021/0407969 A1* | 12/2021 | Liu ........................ | H01L 33/507 |
| 2023/0411574 A1* | 12/2023 | Hu .......................... | H01L 33/48 |

FOREIGN PATENT DOCUMENTS

| | | | | |
|---|---|---|---|---|
| CN | 111781769 A | * | 10/2020 | ........... G02B 6/0068 |
| CN | 116052528 A | * | 5/2023 | |

* cited by examiner

*Primary Examiner* — Christopher M Raabe

(57) ABSTRACT

A direct-lit backlight module includes a substrate, an optical layer that forms an accommodating space with the substrate, first light emitting units in the accommodating space, second light emitting units in the accommodating space and a control unit electrically connected to the first light emitting units and the second light emitting units. The first light emitting units emit light towards the optical layer and have a first viewing angle. The second light emitting units emit light towards the optical layer and have a second viewing angle. The control unit provides a control signal to selectively drive the first light emitting units and the second light emitting units. The first light emitting units are adjacent to the second light emitting units. The first light emitting units and the second light emitting units are arranged alternately. The first viewing angle is larger than the second viewing angle.

20 Claims, 4 Drawing Sheets

DIRECT-LIT BACKLIGHT MODULE FOR DISPLAY DEVICE AND DISPLAY DEVICE

This application claims the benefit of People's Republic of China application Serial No. 202211364014.2, filed Nov. 2, 2022, the subject matter of which is incorporated herein by reference.

BACKGROUND

Technical Field

The disclosure relates to a backlight module and a display device and more particularly to a direct-lit backlight module and a display device.

Description of the Related Art

A direct-lit backlight module for a display device adopts a design in which light emitting units are disposed behind the display panel (e.g. towards a non-display surface). The type of the light emitting unit will affect display effects, such as uniformity and contrast, of the display device. For example, a direct-lit backlight module using light emitting units with larger viewing angles results in a thicker backlight module since the light emitting units with larger viewing angles requires a larger light mixing distance. Moreover, the light emitting units with larger viewing angles may cause an obvious halo effect, poor contrast and poor uniformity of the display image, thereby influencing the consumer experience.

Therefore, how to provide a new direct-lit backlight module and display device to solve above problems is the goal of those skilled in the art.

SUMMARY

According to an embodiment of the present disclosure, a direct-lit backlight module for a display device is provided. The direct-lit backlight module includes a substrate, an optical layer, first light emitting units, second light emitting units and a control unit. The optical layer and the substrate form an accommodating space. The first light emitting units are in the accommodating space. The first light emitting units emit light towards the optical layer and have a first viewing angle. The second light emitting units are in the accommodating space. The second light emitting units emit light towards the optical layer and have a second viewing angle. The control unit is electrically connected to the first light emitting units and the second light emitting units. The control unit provides a control signal to selectively drive the first light emitting units and the second light emitting units. The first light emitting units are adjacent to the second light emitting units. The first light emitting units and the second light emitting units are arranged alternately. The first viewing angle is larger than the second viewing angle.

According to another embodiment of the present disclosure, a display device is provided. The display device includes a display panel and a direct-lit backlight module. The display panel includes a display surface and a non-display surface. The direct-lit backlight module is on the non-display surface of the display panel. The direct-lit backlight module includes a substrate, first light emitting units, second light emitting units and a control unit. The first light emitting units are disposed on one side of the substrate facing the display panel. The first light emitting units have a first viewing angle. The second light emitting units are disposed on one side of the substrate facing the display panel. The second light emitting units have a second viewing angle. The first light emitting units are adjacent to the second light emitting units. The first light emitting units and the second light emitting units are arranged alternately on the substrate. The first viewing angle is larger than the second viewing angle. The control unit is electrically connected to the first light emitting units and the second light emitting units. The control unit provides a control signal to selectively drive the first light emitting units and the second light emitting units.

The above and other embodiments of the disclosure will become better understood with regard to the following detailed description of the non-limiting embodiment(s). The following description is made with reference to the accompanying drawings.

DETAILED DESCRIPTION

The illustrations may not be necessarily drawn to scale, and there may be other embodiments of the present disclosure which are not specifically illustrated. Thus, the specification and the drawings are to be regarded as an illustrative sense rather than a restrictive sense. Moreover, the descriptions disclosed in the embodiments of the disclosure such as detailed construction, manufacturing steps and material selections are for illustration only, not for limiting the scope of the disclosure. The steps and elements in details of the embodiments could be modified or changed according to the actual needs of the practical applications. The disclosure is not limited to the descriptions of the embodiments. The illustration uses the same/similar symbols to indicate the same/similar elements.

Moreover, use of ordinal terms such as "first", "second", "third", etc., in the specification and claims to modify an element or a step does not by itself imply any priority, precedence, or order of one claim element or step over another, but are used merely as labels to distinguish one claim element or step having a certain name from another element or step having the same name (but for use of the ordinal term) to distinguish the claim elements or steps.

Figure 1:
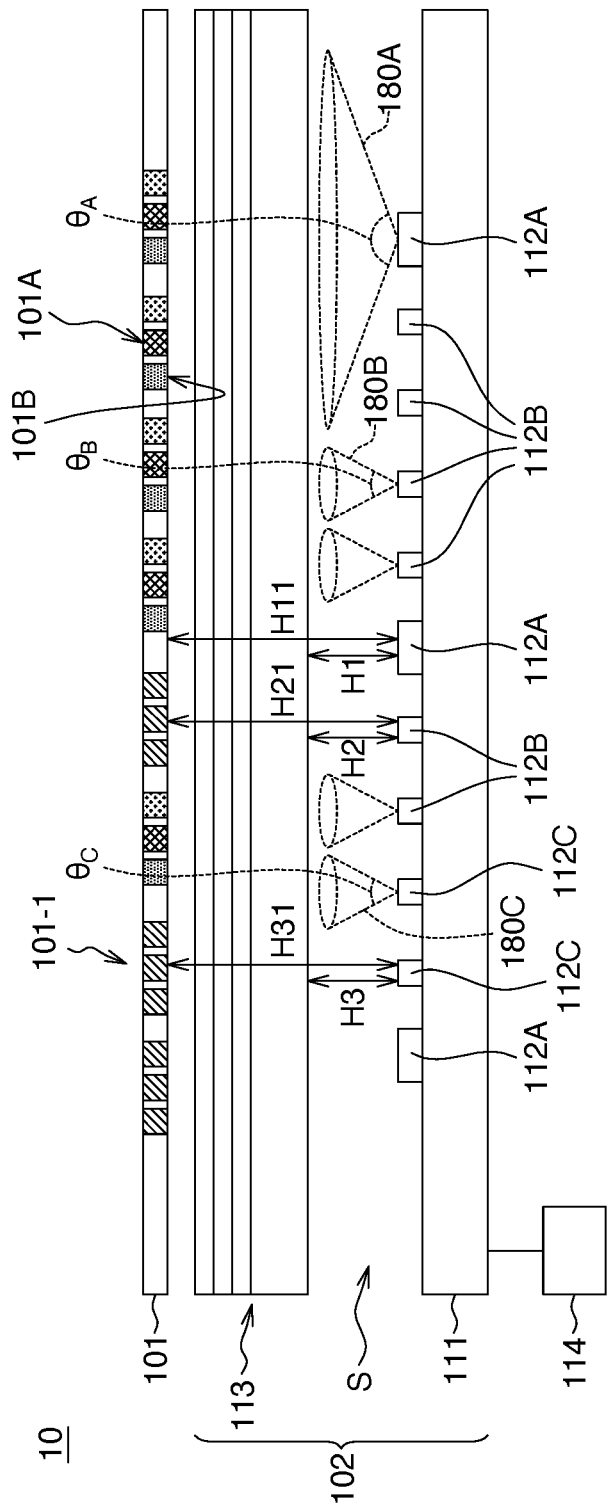
FIG. 1 shows a cross-sectional view of a display device according to an embodiment of the present disclosure.

Please refer to FIG. 1, which shows a cross-sectional view of a display device 10 according to an embodiment of the present disclosure. The display device 10 includes a display panel 101 and a direct-lit backlight module 102. The display panel 101 includes a display surface 101A and a non-display surface 101B opposite to the display surface 101A. The display surface 101A of the display panel 101 includes a display area 101-1 for presentation of information (e.g. graphics, text and images, etc.). The direct-lit backlight module 102 is disposed on the non-display surface 101B of the display panel 101. The direct-lit backlight module 102 can be used as the light source for the display panel 101 to produce images. The display panel 101 is disposed on the light emitting side of the direct-lit backlight module 102. For example, the display panel 101 can be a liquid crystal display (LCD) panel.

The direct-lit backlight module 102 includes a substrate 111, an optical layer 113, first light emitting units 112A, second light emitting units 112B and a control unit 114. For example, the substrate 111 can be a circuit board or bezel. The optical layer 113 is disposed between the substrate 111 and the display panel 101. The optical layer 113 and the substrate 111 form an accommodating space S. The optical layer 113 may include at least one optical film; for example, the optical layer 113 may include one of a diffuser, a quantum dot film (QD film), a prism film and a dual brightness enhancement film (DBEF) or a combination thereof. The first light emitting units 112A and the second light emitting units 112B are disposed on one side of the substrate 111 facing the display panel 101. The first light emitting units 112A and the second light emitting units 112B are in the accommodating space S. The first light emitting units 112A and the second light emitting units 112B emit lights towards the optical layer 113. The first light emitting units 112A are adjacent to the second light emitting units 112B. As shown in FIG. 1, the first light emitting units 112A and the second light emitting units 112B are arranged alternately. That is, the first light emitting units 112A and the second light emitting units 112B are not gathered and disposed in different regions of the substrate 111. One or more second light emitting units 112B can be disposed between adjacent two first light emitting units 112A. Part of the second light emitting units 112B may surround part of the first light emitting units 112A.

In an embodiment, the direct-lit backlight module 102 further includes third light emitting units 112C. The third light emitting units 112C are disposed on one side of the substrate 111 facing the display panel 101. The third light emitting units 112C are in the accommodating space S. The third light emitting units 112C emit lights towards the optical layer 113. The third light emitting units 112C may be adjacent to the first light emitting units 112A and/or the second light emitting units 112B. The first light emitting units 112A, the second light emitting units 112B and the third light emitting units 112C may be arranged alternately. For example, the second light emitting units 112B can be disposed between the first light emitting units 112A and the third light emitting units 112C. For example, the first light emitting units 112A, the second light emitting units 112B and the third light emitting units 112C may include light-emitting diodes (LEDs), micro light-emitting diodes (micro-LEDs), or mini light-emitting diodes (mini-LEDs). The first light emitting units 112A, the second light emitting units 112B and the third light emitting units 112C may include the same type of light emitting diodes or different types of light-emitting diodes.

There is a distance H1 between the first light emitting unit 112A and the optical layer 113. There is a distance H2 between the second light emitting unit 112B and the optical layer 113. There is a distance H3 between the third light emitting unit 112C and the optical layer 113. In this embodiment, the distance H1 is approximately equal to or larger than the distance H2. The distance H1 is approximately equal to or larger than the distance H3.

There is a distance H11 between the first light emitting unit 112A and the display panel 101. There is a distance H21 between the second light emitting unit 112B and the display panel 101. There is a distance H31 between the third light emitting unit 112C and the display panel 101. In this embodiment, the distance H11 is approximately equal to or larger than the distance H21. The distance H11 is approximately equal to or larger than the distance H31.

Light emitted by the first light emitting unit 112A has a first beam shape 180A, and the first beam shape 180A has a first viewing angle $\theta_A$. Light emitted by the second light emitting unit 112B has a second beam shape 180B, and the second beam shape 180B has a second viewing angle $\theta_B$. Light emitted by the third light emitting unit 112C has a third beam shape 180C, and the third beam shape 180C has a third viewing angle $\theta_C$. The first viewing angle $\theta_A$ of the first light emitting unit 112A is larger than the second viewing angle $\theta_B$ of the second light emitting unit 112B. The first viewing angle $\theta_A$ of the first light emitting unit 112A is larger than the third viewing angle $\theta_C$ of the third light emitting unit 112C. The third viewing angle $\theta_C$ of the third light emitting unit 112C and the second viewing angle $\theta_B$ of the second light emitting unit 112B may be the same or different. In an embodiment, the first viewing angle $\theta_A$ of the first light emitting unit 112A is larger than 150°. In an embodiment, the second viewing angle $\theta_B$ of the second light emitting unit 112B is smaller than 150°. In an embodiment, the third viewing angle $\theta_C$ of the third light emitting unit 112C is smaller than 150°.

In an embodiment, part of the second light emitting units 112B can surround one or more first light emitting units 112A, and part of the third light emitting unit 112C can surround one or more second light emitting units 112B and one or more first light emitting units 112A; that is, one or more first light emitting units 112A are surrounded by at least two layers (rows) of light emitting units having smaller viewing angles (as compared with the first viewing angle of the first light emitting unit 112A).

Figure 2:
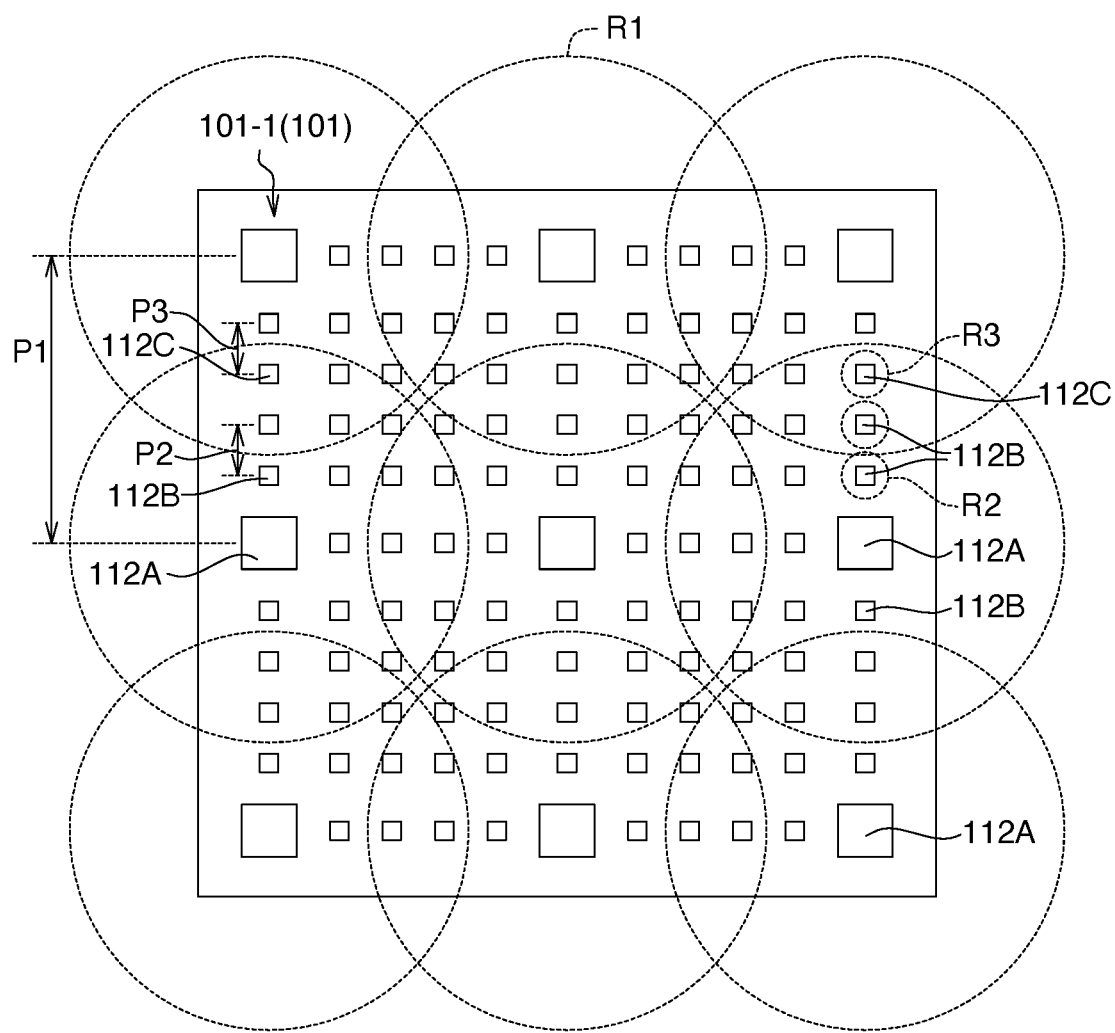
FIG. 2 shows a top view of a display device according to an embodiment of the present disclosure.

Please refer to FIG. 1 and FIG. 2. FIG. 2 shows a top view of the display device 10 of FIG. 1. Among the first light emitting units 112A, there is a first pitch P1 between adjacent two first light emitting units 112A. Among the second light emitting units 112B, there is a second pitch P2 between adjacent two second light emitting units 112B. The first pitch P1 is larger than the second pitch P2. Among the third light emitting units 112C, there is a third pitch P3 between adjacent two third light emitting units 112C. The first pitch P1 is larger than the third pitch P3. The second pitch P2 and the third pitch P3 may be the same or different.

The first light emitting unit 112A has a first illumination range R1. The second light emitting unit 112B has a second illumination range R2. The third light emitting unit 112C has a third illumination range R3. The term "illumination range" can be understood as a region illuminated with the light emitted by the light emitting unit when the light emitted by the light emitting unit travels to the display panel 101. In FIG. 2, the illumination ranges of the light emitting units are indicated by dotted lines. The first illumination ranges R1 overlap with each other. At least part of the first illumination range R1 overlaps with the second illumination range R2. At least part of the first illumination range R1 overlaps with the third illumination range R3. The second illumination ranges R2 may overlap with each other or may be non-overlapping. The third illumination ranges R3 may overlap with each other or may be non-overlapping. All of the display area 101-1 of the display panel 101 can be covered by the first illumination ranges R1 of the first light emitting units 112A. That is, all of the display area 101-1 can be illuminated with only all of the first light emitting units 112A emitting light. Alternatively, all of the display area 101-1 can be illuminated with only all of the second light emitting units 112B emitting light. Alternatively, all of the display area 101-1 can be illuminated with only all of the third light emitting units 112C emitting light. The display device 10 can present information (e.g. graphics, text and images, etc.) with only all of the first light emitting units 112A emitting light or all of the second light emitting units 112B emitting light or all of the third light emitting units 112C emitting light.

The arrangement of the first light emitting units 112A, the second light emitting units 112B and the third light emitting units 112C emitting light is not limited to the arrangement shown in FIG. 2. The second light emitting units 112B and/or the third light emitting units 112C may be disposed among the first light emitting units 112A without a specific order. The second light emitting units 112B and/or the third light emitting units 112C may be disposed randomly among the first light emitting units 112A.

The control unit 114 of the direct-lit backlight module 102 is electrically connected to the first light emitting units 112A and the second light emitting units 112B. In the case that the direct-lit backlight module 102 includes the third light emitting units 112C, the control unit 114 is also electrically connected to the third light emitting units 112C. As an example, the following description of the control unit 114 is based on the case of including the third light emitting units 112C; however, it does not mean that the display device of the present disclosure can only be operated under the condition of including the third light emitting units 112C. The case of not including the third light emitting units 112C can be deduced according to the following description. The control unit 114 provides a control signal to selectively drive the first light emitting units 112A, the second light emitting units 112B and the third light emitting units 112C. The term "selectively drive" means that the first light emitting units 112A, the second light emitting units 112B and the third light emitting units 112C do not necessarily emit light at the same time. For example, the control unit 114 provides the control signal such that part of the first light emitting units 112A emit light and part of the second light emitting units 112B and the third light emitting units 112C emit light, which can keep the contrast of the display image and power consumption in an appropriate range, and achieve a balance between the contrast of the display image and power consumption.

Alternatively, the control unit 114 provides the control signal such that all of the first light emitting units 112A emit light, the second light emitting units 112B do not emit light, and the third light emitting units 112C do not emit light; in this case, the display area 101-1 is illuminated with only the first light emitting units 112A emitting light and thus power consumption can be reduced. Alternatively, the control unit 114 provides the control signal such that the first light emitting units 112A do not emit light, all of the second light emitting units 112B emit light, and all of the third light emitting units 112C emit light; in this case, the display area 101-1 is illuminated with only the first light emitting units 112A or the third light emitting units 112C emit light and thus excellent contrast can be achieved.

Figure 3A:
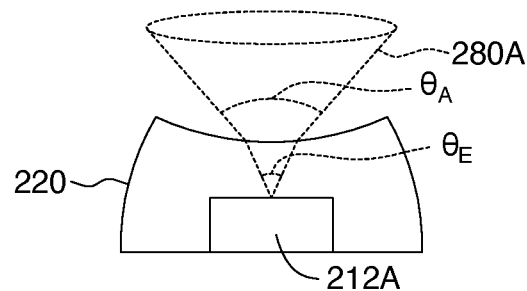
FIG. 3A shows a schematic view of a light emitting unit according to an embodiment of the present disclosure.
Figure 3B:
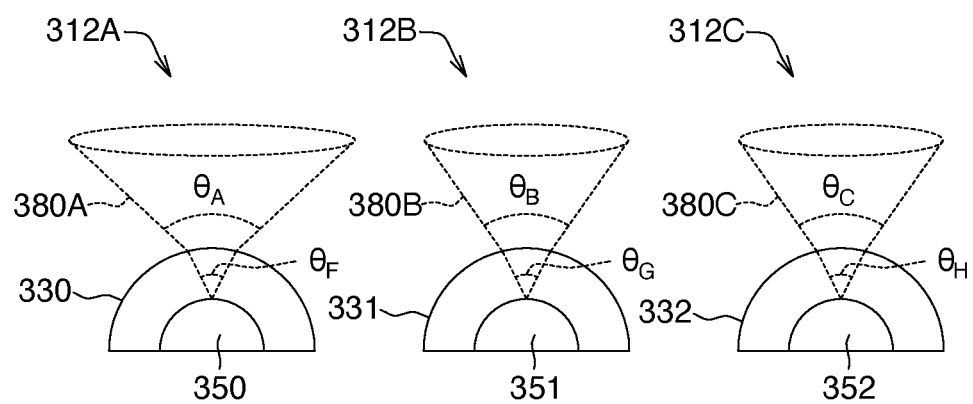
FIG. 3B shows a schematic view of light emitting units according to another embodiment of the present disclosure.

The light emitting units applicable to the present disclosure are not limited to the types shown in FIG. 1. FIGS. 3A and 3B shows two of the light emitting units applicable to the present disclosure. As shown in FIG. 3A, the direct-lit backlight module 102 further includes an optical element 220. For example, the optical element 220 can be an optical lens, a film including microstructures, etc. The optical element 220 may change the direction of light passing through the optical element 220 so as to increase the viewing angle of light. The optical element 220 may be disposed between the light emitting units and the optical layer. The optical element 220 may be disposed between the light emitting units and the display panel. For example, the optical element 220 can be disposed in the optical path of the first light emitting unit 212A and between the first light emitting unit 212A and the optical layer; the first beam shape 280A of light emitted by the first light emitting unit 212A has a fourth viewing angle $\theta_E$ before the light passes through the optical element 220, and has the first viewing angle $\theta_A$ after the light passes through the optical element 220; the fourth viewing angle $\theta_E$ is smaller than the first viewing angle $\theta_A$. In this embodiment, the combination of the optical element 220 and the first light emitting unit 212A can replace the first light emitting unit 112A shown in FIG. 1.

In another embodiment, as shown in FIG. 3B, the first light emitting unit 312A includes a first light emitting diode die 350 and a first optical element 330. The first optical element 330 is disposed between the first light emitting diode die 350 and the display panel. The first optical element 330 can be disposed between the first light emitting diode die 350 and the optical layer. The second light emitting unit 312B includes a second light emitting diode die 351 and a second optical element 331. The second optical element 331 is disposed between the second light emitting diode die 351 and the display panel. The second optical element 331 can be disposed between the second light emitting diode die 351 and the optical layer. The third light emitting unit 312C includes a third light emitting diode die 352 and a third optical element 332. The third optical element 332 is disposed between the third light emitting diode die 352 and the display panel. The third optical element 332 can be disposed between the third light emitting diode die 352 and the optical layer. For example, the first optical element 330, the second optical element 331 and the third optical element 332 can be optical lenses, films including microstructures, encapsulation gels, etc. The first optical element 330, the second optical element 331 and the third optical element 332 may change the direction of light passing through them so as to increase the viewing angle of light.

The first beam shape 380A of light emitted by the first light emitting diode die 350 has a fifth viewing angle $\theta_F$ before the light passes through the first optical element 330, and has the first viewing angle $\theta_A$ after the light passes through the first optical element 330. The second beam shape 380B of light emitted by the second light emitting diode die 351 has a sixth viewing angle $\theta_G$ before the light passes through the second optical element 331, and has the second viewing angle $\theta_B$ after the light passes through the second optical element 331. The third beam shape 380C of light emitted by the third light emitting diode die 352 has a seventh viewing angle $\theta_H$ before the light passes through the third optical element 332, and has the third viewing angle $\theta_C$ after the light passes through the third optical element 332. The fifth viewing angle $\theta_F$, sixth viewing angle $\theta_G$ and seventh viewing angle $\theta_H$ can be the same. The first optical element 330 can be different from the second optical element 331 and the third optical element 332. For example, the first optical element 330 can be different from the second optical element 331 and the third optical element 332 in their ability to diffuse light such that the viewing angle (e.g. first viewing angle $\theta_A$) of light passing through the first optical element 330 can be larger than the viewing angle (e.g. second viewing angle $\theta_B$) of light passing through the second optical element 331 and the viewing angle (e.g. third viewing angle $\theta_C$) of light passing through the third optical element 332.

In yet another embodiment, the direct-lit backlight module may include an optical element for reducing the viewing angle of light. The optical element for reducing the viewing angle of light can be used with the second light emitting unit or the third light emitting unit, such that the viewing angle of light, emitted by the second light emitting unit or the third light emitting unit and passing through the optical element for reducing the viewing angle of light, is smaller than the first viewing angle.

The light emitting units shown in FIGS. 3A and 3B may be used with the light emitting units shown in FIG. 1 or may replace the light emitting units shown in FIG. 1. For example, the first light emitting units of the direct-lit backlight module may include one or more of the first light emitting unit 112A shown in FIG. 1, a combination of the optical element 220 and the first light emitting unit 212A, and the first light emitting unit 312A shown in FIG. 3B. The second light emitting units of the direct-lit backlight module may include one or more of the second light emitting unit 112B shown in FIG. 1, the second light emitting unit 312B shown in FIG. 3B, the optical element for reducing the viewing angle of light. The third light emitting units of the direct-lit backlight module may include one or more of the third light emitting units 112C shown in FIG. 1, the third light emitting unit 312C shown in FIG. 3B, the optical element for reducing the viewing angle of light.

Figure 4:
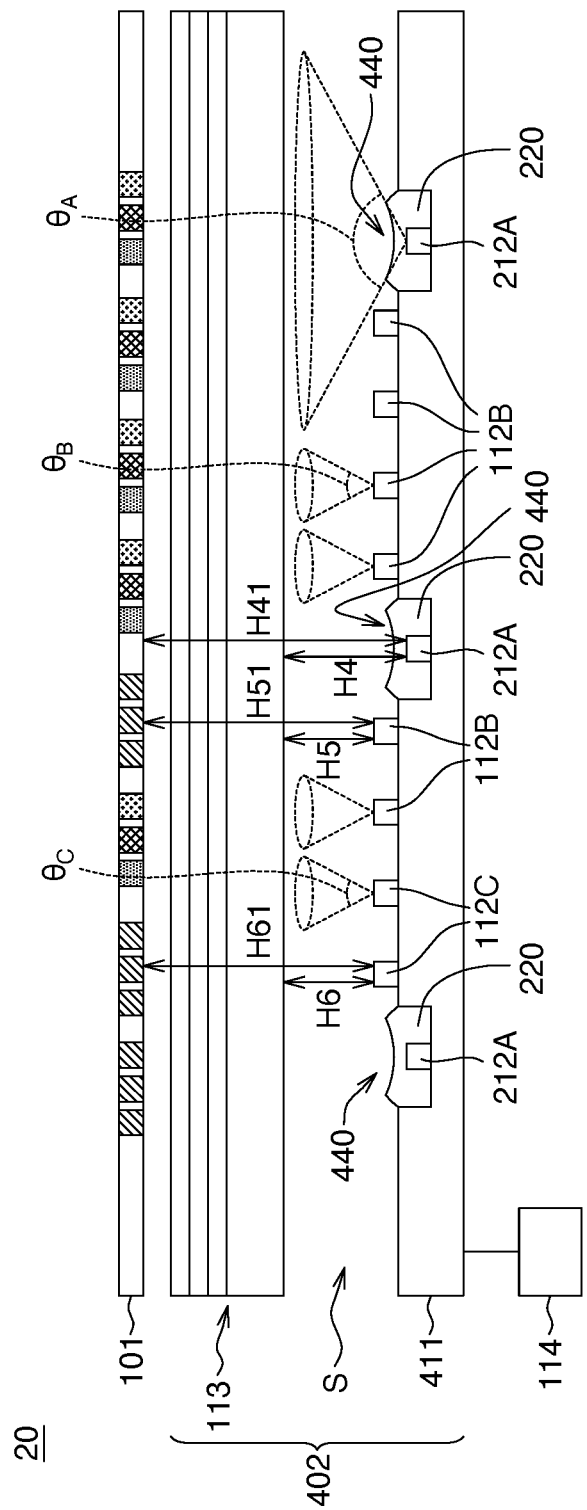
FIG. 4 shows a cross-sectional view of a display device according to another embodiment of the present disclosure.

FIG. 4 shows a cross-sectional view of a display device 20 according to another embodiment of the present disclosure.

In the display device 20, the direct-lit backlight module 402 includes a substrate 411, an optical layer 113, the optical elements 220, the first light emitting units 212A, the second light emitting units 112B, the third light emitting units 112C and the control unit 114.

The direct-lit backlight module 402 is different from the direct-lit backlight module 102 in that the substrate 411 of the direct-lit backlight module 402 includes one or more recesses 440 in the accommodating space S. The recess 440 is disposed on one side of the substrate 411 facing the display panel 101. The recess 440 is recessed along a direction away from the optical layer 113. The recess 440 is recessed along a direction away from the display panel 101. A bottom of the recess 440 may be lower than an upper surface of the substrate 411 closest to the optical layer 113. For example, the substrate 411 can be a circuit board. The first light emitting unit 212A is in the recess 440 and emits light towards the opening of the recess 440. In an embodiment, the optical element 220 can be disposed between the first light emitting unit 212A and the optical layer 113. The optical element 220 may be disposed between the first light emitting unit 212A and the display panel 101. In this embodiment, the optical element 220 is in the recess 440, but the present disclosure is not limited thereto. The optical element 220 may be disposed at the opening of the recess 440 and cover the opening of the recess 440. Through use of the recess 440, the light mixing distance required by the light emitting unit can be ensured without increasing the thickness of the backlight module, which can make the display device thinner.

In an embodiment, there is a distance H4 between the first light emitting unit 212A and the optical layer 113. There is a distance H5 between the second light emitting unit 112B and the optical layer 113. There is a distance H6 between the third light emitting unit 112C and the optical layer 113. The distance H4 is larger than the distance H5. The distance H4 is larger than the distance H6. There is a distance H41 between the first light emitting unit 212A and the display panel 101. There is a distance H51 between the second light emitting unit 112B and the display panel 101. There is a distance H61 between the third light emitting unit 112C and the display panel 101. The distance H41 is larger than the distance H51. The distance H41 is larger than the distance H61.

In some embodiments, the first light emitting units 212A and the optical elements 220 of the direct-lit backlight module 402 can be replaced with the first light emitting units 112A shown in FIG. 1 or the first light emitting units 312A shown in FIG. 3B.

According to above embodiments, the direct-lit backlight module and the display device of the present disclosure include light emitting units having larger viewing angles (e.g. the first light emitting units) and light emitting units having smaller viewing angles (e.g. the second light emitting units) disposed in proper relative positions. As compared with the display device that only uses light emitting units having larger viewing angles, the number of light emitting units having larger viewing angles used in the display device of the present disclosure is reduced; as such, the halo effect can be reduced and the contrast and uniformity of display image can be improved. As compared with the display device that only uses light emitting units having smaller viewing angles, the number of light emitting units having smaller viewing angles used in the display device of the present disclosure is reduced, and the illumination range is supplemented by light emitting units having larger viewing angles in the display device of the present disclosure; as such, the power consumption and manufacturing cost can be reduced while maintaining the contrast and uniformity of the display image at a good level. In the direct-lit backlight module and the display device of the present disclosure, with the combination of light emitting units having larger viewing angles (e.g. the first light emitting units) and light emitting units having smaller viewing angles (e.g. the second light emitting units), a balance between display quality, power consumption and cost can be achieve. Moreover, user can flexibly adjust the light-emitting mode according to the usage situation, and the direct-lit backlight module and the display device of the present disclosure can be flexibly applied in various situations since the light emitting units having different viewing angles can be selectively driven. Moreover, through use of the recess in the substrate, the light mixing distance required by the light emitting unit can be ensured without increasing the thickness of the backlight module, which can make the display device thinner. The present disclosure is not limited to the above embodiments and can be adjusted or varied properly according to actual demands. The specification and the structures shown in the drawings are used to describe the concepts of the embodiments, and the scope of the disclosure is not limited thereto. Moreover, it could be understood that the component elements in the embodiments are not limited to the shape and the disposition shown in the drawings, and can be adjusted according to the demand and/or process steps of actual applications without deviating from the spirit of the disclosure.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A direct-lit backlight module for a display device, comprising:
   a substrate;

an optical layer, wherein the optical layer and the substrate form an accommodating space;
first light emitting units in the accommodating space, wherein the first light emitting units emit light towards the optical layer and have a first viewing angle;
second light emitting units in the accommodating space, wherein the second light emitting units emit light towards the optical layer and have a second viewing angle; and
a control unit electrically connected to the first light emitting units and the second light emitting units and providing a control signal to selectively drive the first light emitting units and the second light emitting units,
wherein the first light emitting units are adjacent to the second light emitting units, the first light emitting units and the second light emitting units are arranged alternately, and the first viewing angle is larger than the second viewing angle.

2. The direct-lit backlight module according to claim 1, wherein part of the second light emitting units surrounds part of the first light emitting units.

3. The direct-lit backlight module according to claim 1, further comprising third light emitting units in the accommodating space and having a third viewing angle, wherein the third viewing angle is smaller than the first viewing angle, and the second light emitting units are disposed between the first light emitting units and the third light emitting units.

4. The direct-lit backlight module according to claim 1, wherein a first pitch between adjacent two first light emitting units of the first light emitting units is larger than a second pitch between adjacent two second light emitting units of the second light emitting units.

5. The direct-lit backlight module according to claim 1, wherein the first light emitting units have a first illumination range, the second light emitting units have a second illumination range, and at least part of the first illumination range overlaps the second illumination range.

6. The direct-lit backlight module according to claim 1, wherein a first distance between the first light emitting units and the optical layer is larger than or equal to a second distance between the second light emitting units and the optical layer.

7. The direct-lit backlight module according to claim 1, wherein the substrate comprises a recess in the accommodating space, the recess is recessed along a direction away from the optical layer, and the first light emitting units are in the recess.

8. The direct-lit backlight module according to claim 1, further comprising an optical lens disposed between the first light emitting units and the optical layer, wherein light emitted by the first light emitting units has a first beam shape, the first beam shape has a fourth viewing angle before passing through the optical lens and has the first viewing angle after passing through the optical lens, and the fourth viewing angle is smaller than the first viewing angle.

9. The direct-lit backlight module according to claim 1, wherein the first light emitting units comprises a first light emitting diode die and a first optical element between the first light emitting diode die and the optical layer, the second light emitting units comprises a second light emitting diode die and a second optical element between the second light emitting diode die and the optical layer,
wherein light emitted by the first light emitting diode die has a first beam shape, the first beam shape has a fifth viewing angle before passing through the first optical element, and has the first viewing angle after passing through the first optical element,
light emitted by the second light emitting diode die has a second beam shape, the second beam shape has a sixth viewing angle before passing through the second optical element, and has the second viewing angle after passing through the second optical element, the fifth viewing angle is equal to the sixth viewing angle.

10. The direct-lit backlight module according to claim 1, wherein the first viewing angle is larger than 150°, and the second viewing angle is smaller than 150°.

11. A display device, comprising:
a display panel comprising a display surface and a non-display surface; and
a direct-lit backlight module on the non-display surface of the display panel and comprising:
a substrate;
first light emitting units disposed on one side of the substrate facing the display panel and having a first viewing angle;
second light emitting units disposed on one side of the substrate facing the display panel and having a second viewing angle, wherein the first light emitting units are adjacent to the second light emitting units, the first light emitting units and the second light emitting units are arranged alternately on the substrate, and the first viewing angle is larger than the second viewing angle; and
a control unit electrically connected to the first light emitting units and the second light emitting units and providing a control signal to selectively drive the first light emitting units and the second light emitting units.

12. The display device according to claim 11, wherein part of the second light emitting units surrounds part of the first light emitting units.

13. The display device according to claim 11, wherein a first pitch between adjacent two first light emitting units of the first light emitting units is larger than a second pitch between adjacent two second light emitting units of the second light emitting units.

14. The display device according to claim 11, wherein the first light emitting units have a first illumination range, the second light emitting units have a second illumination range, and at least part of the first illumination range overlaps the second illumination range.

15. The display device according to claim 14, wherein the display panel comprises a display area, and the first illumination range covers all of the display area.

16. The display device according to claim 11, wherein a first distance between the first light emitting units and the display panel is larger than or equal to a second distance between the second light emitting units and the display panel.

17. The display device according to claim 11, wherein the substrate comprises a recess disposed on one side of the substrate facing the display panel, the recess is recessed along a direction away from the display panel, and the first light emitting units are in the recess.

18. The display device according to claim 11, further comprising an optical lens disposed between the first light emitting units and the display panel, wherein light emitted by the first light emitting units has a first beam shape, the first beam shape has a fourth viewing angle before passing through the optical lens and has the first viewing angle after passing through the optical lens, and the fourth viewing angle is smaller than the first viewing angle.

19. The display device according to claim 11, wherein the first light emitting units comprises a first light emitting diode die and a first optical element between the first light emitting diode die and the display panel, the second light emitting units comprises a second light emitting diode die and a second optical element between the second light emitting diode die and the display panel,
- wherein light emitted by the first light emitting diode die has a first beam shape, the first beam shape has a fifth viewing angle before passing through the first optical element, and has the first viewing angle after passing through the first optical element,
- light emitted by the second light emitting diode die has a second beam shape, the second beam shape has a sixth viewing angle before passing through the second optical element, and has the second viewing angle after passing through the second optical element, the fifth viewing angle is equal to the sixth viewing angle.

20. The display device according to claim 11, wherein the first viewing angle is larger than 150°, and the second viewing angle is smaller than 150°.

\* \* \* \* \*